United States Patent
Zuo

(10) Patent No.: US 8,689,106 B1
(45) Date of Patent: Apr. 1, 2014

(54) METHOD AND APPARATUS FOR DISPLAYING LOGICAL INFORMATION ON STORAGE AND NETWORK DEVICES

(75) Inventor: Xiaoshan Zuo, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 936 days.

(21) Appl. No.: 11/541,283

(22) Filed: Sep. 28, 2006

(51) Int. Cl.
*G06F 3/0481* (2013.01)

(52) U.S. Cl.
USPC ........... 715/736; 715/735; 715/738; 715/740; 715/751

(58) Field of Classification Search
USPC ........................... 715/736, 735, 738, 740, 751
See application file for complete search history.

(56) References Cited

U.S. PATENT DOCUMENTS

| | | | | |
|---|---|---|---|---|
| 6,934,711 | B2 * | 8/2005 | Pooni et al. | 707/100 |
| 7,039,870 | B2 * | 5/2006 | Takaoka et al. | 715/736 |
| 7,441,080 | B2 * | 10/2008 | Kano | 711/112 |
| 7,454,591 | B2 * | 11/2008 | Matsui et al. | 711/209 |
| 2003/0154271 | A1 * | 8/2003 | Baldwin et al. | 709/223 |

* cited by examiner

*Primary Examiner* — Namitha Pillai
(74) *Attorney, Agent, or Firm* — Campbell Stephenson LLP

(57) ABSTRACT

A method and apparatus for displaying logical information upon devices within a computer system. The method and apparatus include a logical volume information server coupled to a volume manager that provides the logical information that is created by the volume manager to at least one device. The at least one device comprise a logical volume information client that receives the logical information from the logical volume information server and displays that logical volume information upon the network or storage device. In this manner, an operator may quickly identify the logical information that corresponds to a physical device within a network or a storage appliance.

13 Claims, 2 Drawing Sheets

METHOD AND APPARATUS FOR DISPLAYING LOGICAL INFORMATION ON STORAGE AND NETWORK DEVICES

BACKGROUND OF THE INVENTION

1. Field of the Invention

Embodiments of the present invention generally relate to computer systems and, more particularly, to a method and apparatus for displaying logical information on storage and network devices within a computer system.

2. Background of the Related Art

Modern computer systems utilize a variety of storage and network devices to facilitate the storage and communication of data amongst computers. Most computer systems utilize logical information, e.g., logical unit numbers (LUN), to identify devices throughout a system. By using logical information rather than an actual physical address for a device, the computer system can be flexible and enable users to access devices based upon the logical information rather than a physical address. As such, the system can be physically altered to replace a failed device, route data around failed network devices, restore data to new or additional devices, yet the logical information remains constant. A computer within the system can communicate with and otherwise utilize services, even though the physical system has changed.

The process of assigning a logical identification to devices, or groups of devices, is known in the art as virtualization. In a virtualized system, a client computer may request data or a service from a network device without knowing the actual physical address of the network device. A volume manager or other network control unit will identify the device using the logical information. In this manner, a client computer does not have knowledge of physical addresses for the devices to which it must communicate.

For example, in a network storage system, generally, there is a host computer that provides a volume manager for managing the logical information. The volume manager maps the logical information to the physical addresses of the devices under its control. The devices within a storage system are generally disk drives or groups of disk drives that store information. A client computer accesses the data through the host by requesting specific information. The volume manager will understand where that information is stored within a physical device and map the request from the logical address to the physical address to access the information. The information that is stored on the disk drive is then provided through a communication network to the client computer. When an error occurs in a physical device, resulting from, for example, disk drive crash or other access problem, the volume manager understands that there is a disk drive malfunction. An operator will then be required to replace the failed device or, at least, inspect the device causing the error. However, the volume manager information that is available to the operator is generally the logical unit number of the failed device. Given only the logical information, the operator is then tasked to determine which physical device has actually failed. This can be a tedious and time-consuming operation.

Therefore, there is a need in the art to display the logical information corresponding to a network or a storage device upon the device such that the operator can quickly determine which device has failed or otherwise requires attention.

SUMMARY OF THE INVENTION

A method and apparatus for displaying logical information upon devices within a computer system. The method and apparatus include a logical volume information server coupled to a volume manager that provides the logical information that is created by the volume manager to at least one device. The at least one device comprise a logical volume information client that receives the logical information from the logical volume information server and displays that logical volume information upon the network or storage device. In this manner, an operator may quickly identify a particular physical device within a network or storage appliance from logical information displayed on the device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
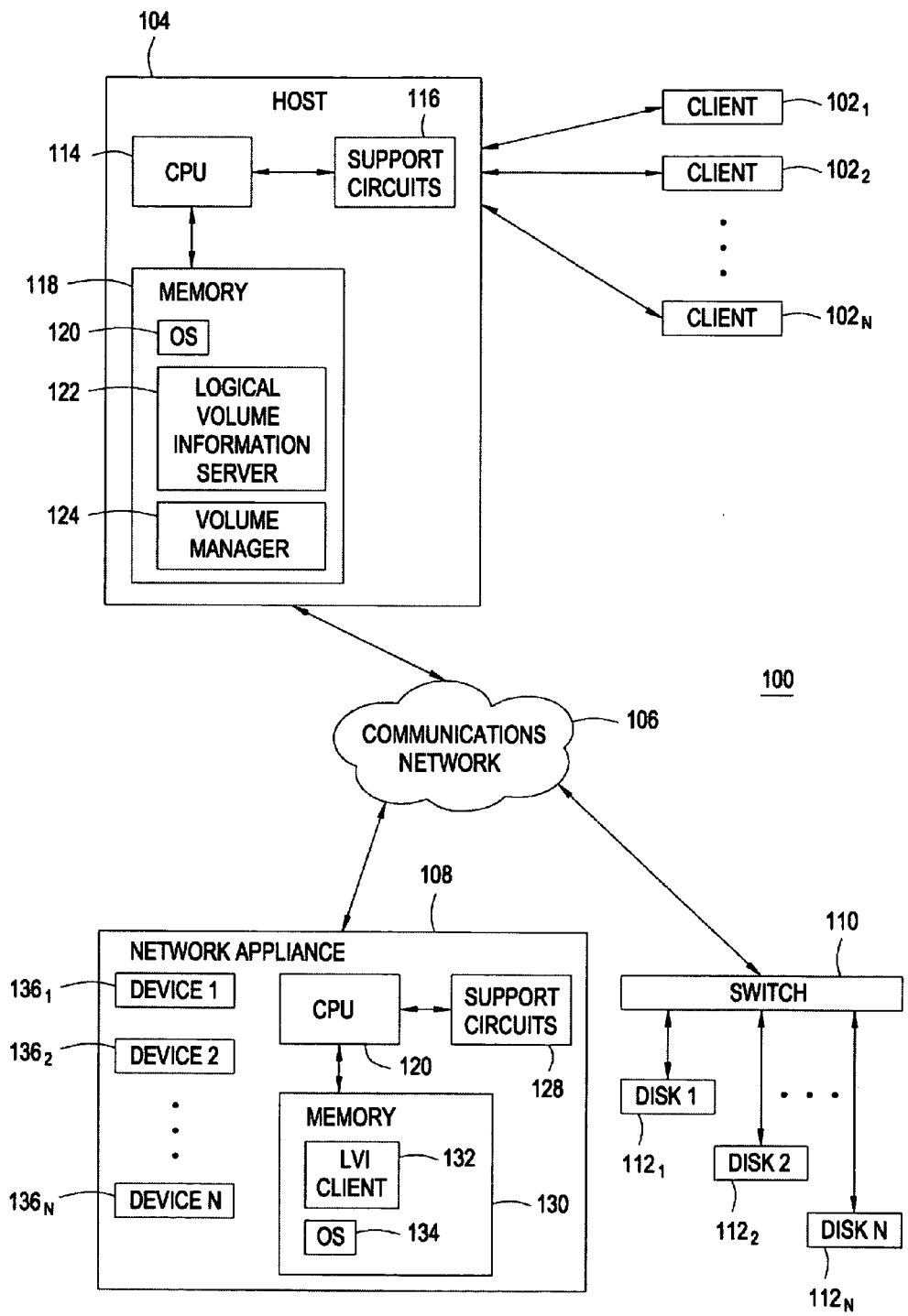
FIG. 1 depicts a block diagram of a system for providing logical volume information to a storage device.

FIG. 1 depicts a system 100 for providing network and/or storage services to client computers $102_1, 102_2, \ldots 102_N$. This system comprises a host computer 104 that is coupled to a communications network 106. The communications network 106 is coupled to at least one network appliance 108 and 110. Generally, client computers $102_1, 102_2, \ldots 102_N$ communicate with the host computer 104 to request network services such as data storage, distributed application utilization, network communication services, and the like. The host computer communicates with a communication network 106 to identify and utilize various network appliances 108, 110 that can provide the services to the clients. For simplicity, only one host is depicted. Those skilled in the art should understand that multiple hosts may be used in other embodiments of this invention. Network appliances 108, 110 may include communications portals, storage systems, network switches, and the like. As an example of network appliances, system 100 comprises a storage system 108 and a network switch 110.

The host computer 104 comprises a central processing unit (CPU) 114, support circuits 116, and memory 118. The CPU 114 may be any one of the many available types of microprocessors or microcontrollers available in the art. The support circuits 116 comprise various circuits to facilitate operation of the CPU 114. The support circuits 116, for example, may comprise at least one of cache, power supplies, clock circuits, network interface cards, and the like. The memory 118 may comprise any one or a combination of various types of memory that are used for storing digital information. Such memories include random access memory, read-only memory, removable memory, disk drives, optical storage, and the like. The memory 118 stores an operating system 120, logical volume information server software 122, and a volume manager 124. Other software may be stored such as application software and data information. The operating system 120 may be one of many available operating systems such as WINDOWS, UNIX, LINUX, OSX, and the like.

The communications network 106 may be any form of communications network that couples the host computer to various network appliances including Ethernet, Internet, and the like.

The network appliance 108 may be any one of a variety of network appliances that provide services to the host computer. These services may include backup services for data stored within the host, data management services, application services such as database management and data access, and communication services such as portal switching. The network appliance 108 comprises a central processing unit (CPU) 120, support circuits 128, and memory 130. As with the host computer 104, the CPU 120 may be one of a number of available microprocessors and microcontrollers available in the art. The support circuits 128 are designed to facilitate operation of the CPU 120. The support circuits 128 may, for example, comprise cache, power supplies, clock circuits, network interface circuits, and the like. The memory 130 may, for example, comprise one or more available memories for storing digital information. This memory 130 may comprise one or more of random access memory, read-only memory, optical memory, removable memory, disk drives, and the like. The memory 130 stores a logical volume information client 132 and an operating system 134. The operating system 134 provides management of the various devices that store data, or provide other network services. Such devices include devices $136_1$, $136_2$, ... $136_N$. In one embodiment of the invention, these devices are disk drives that are used for storing information as network storage, backup storage, and the like. The operating system 134 controls data access to the devices 136 and manages these devices 136.

In another embodiment of the invention, the network appliance may be a switch 110. In the embodiment shown, the switch 110 is coupled to a plurality of disk drives $112_1$, $112_2$, ... $112_N$. In lieu of disk drives 112, the switch may be coupled to entire storage units that allow for RAID storage of information for backup and archiving purposes. In other embodiments, the switch may be coupled to other forms of network devices that provide network services.

The volume manager 124 within the host 104 defines the logical information for the network appliance and/or the switch 110. In this manner, a client 102 can request information using a logical address for the service, e.g., a location for data, and the volume manager 124 can determine where that information is stored using the logical information. The logical information is used to locate the data or the service that is being requested by a client 102. In this manner, from the client's point of view, the physical addresses of the network appliances are virtualized. Simply stated, the client does not know the physical address of the service or data, only a virtual address, i.e., the logical information.

One embodiment of the invention utilizes logical volume information server 122 to extract the logical information from the volume manager for each of the network appliances that are utilized by the host 104. The logical volume information (LVI) server 122 provides this information to the network appliances such that the network appliances 108, 110, which contain LVI clients 132, can process the logical information and supply that information to their devices. The physical devices 112, 136 then display the logical information such that an operator can easily identify which physical device is identified by the volume manager using particular logical identifier. As such, when an error occurs in a particular device 112, 136, the volume manager 124 notifies an operator of the logical information for the device and the operator can quickly identify the device via the logical information display.

Figure 2:
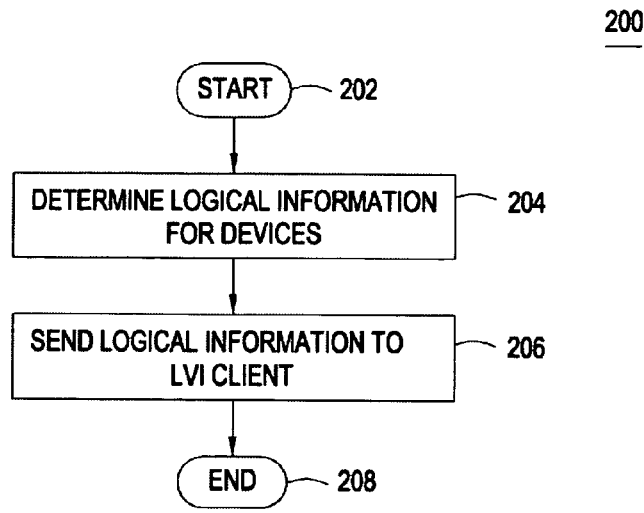
FIG. 2 depicts a flow diagram of a method for providing logical information to a network appliance.

FIG. 2 depicts a flow diagram of the method 200 of operation for the LVI server 122. The method 200 begins at step 202 and proceeds to step 204, wherein the method 200 determines the logical information for the devices that are coupled to the host. This is performed by communicating with the volume manager and providing the logical information for each of the network appliances that are addressed by the host. The logical information, in one embodiment, is located in a table within the volume manager. At step 206, this logical information is sent to the LVI client within each of the network appliances via the network. The process ends at step 208.

Figure 3:
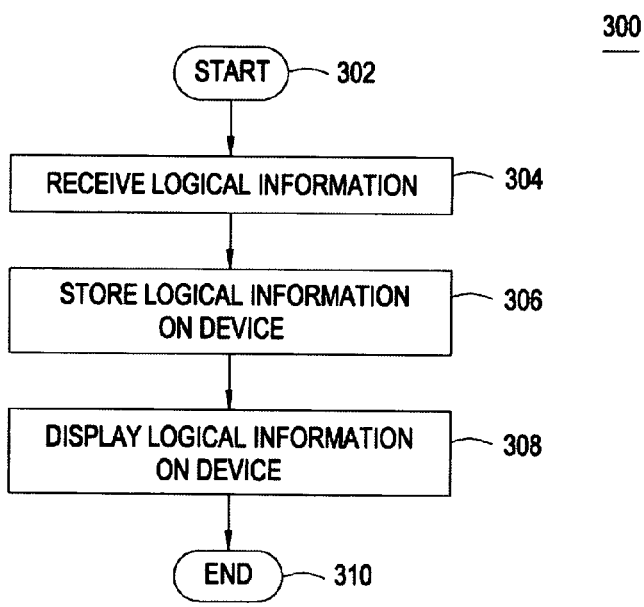
FIG. 3 depicts a flow diagram of a method for receiving and displaying logical information on a network appliance.

FIG. 3 depicts a flow diagram of a method 300 of operation of one exemplary embodiment of the LVI client within a network appliance. Each network appliance contains an LVI client that performs the method 300 in accordance with the present invention. The method 300 begins at step 302 and proceeds to step 304, wherein the method 300 receives the logical information from the host. At step 306, the logical information is stored within the network appliance or the device that is controlled by the network appliance. At step 308, the method 300 displays the logical information on the device, and the method ends at step 310. In this manner, the logical information that is generally only available in a host computer and understood by the volume manager is transmitted to the network appliance and displayed on the physical device that is identified by the logical information. An operator can quickly identify a failed device (or device needing repair or attention) by using the logical information rather than the physical address of the device.

Figure 4:
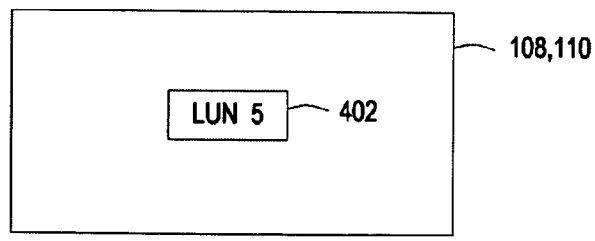
FIG. 4 depicts a display of logical information upon a network appliance.

FIG. 4 depicts a physical device, such as a network appliance 108, 110, having a display 402 which displays a logical unit number, or other logical information, to identify the device to an operator. The display 402 may be a simple LED display that scrolls the logical information across the display 402. Other forms of display are well known in the art.

While the foregoing is directed to embodiments of the present invention, other and further embodiments of the invention may be devised without departing from the basic scope thereof, and the scope thereof is determined by the claims that follow.

The invention claimed is:

1. In a network including multiple network devices for providing service to one or more client computers in the network, each of the network devices having a display device associated with and in physical proximity to the network device,
    wherein the network is configured such that the one or more client computers access the network devices through a host computer in the network,
    wherein the client computers are adapted to identify each of the network devices to the host computer by a respective logical identifier for the network device,
    wherein the host computer is adapted to maintain a correspondence between the logical identifier and a physical address for each of the network devices, and
    wherein the network is configured such that the host computer accesses the network devices through one or more network appliances adapted to manage the network devices,
a method comprising:
    receiving at a network appliance and from the host computer the logical identifier for a network device managed by the network appliance, providing from the network appliance to the network device the corresponding logical identifier for the network device; and effectuating the display of the provided corresponding logical identifier on the display device associated with the network device, such that the network device may be visually identified using its corresponding logical identifier by an observer in physical proximity to the network device.

2. The method of claim 1, wherein the logical identifier comprises a logical unit number.

3. The method of claim 1, further comprising:
assigning the logical identifier to the network device, wherein
the assigning is performed by a volume manager, and
the host computer comprises the volume manager.

4. The method of claim 1, further comprising:
determining a set of logical information for the network appliance, wherein
the determining is performed by the host computer,
the logical information comprises logical identifiers corresponding to a plurality of physical addresses of a plurality of network devices that are controlled by the network appliance, and
sending the logical information to the network appliance.

5. An apparatus for use in a network, the apparatus comprising:
a network appliance adapted to manage a network device, the network device having a display device associated with and in physical proximity to the network device, and the network appliance configured to
receive a logical identifier for the managed network device, wherein
the logical identifier is received from a host computer coupled to the network appliance,
the host computer is adapted to maintain a correspondence between a respective logical identifier and a respective physical address for each of multiple network devices in the network,
the host computer is adapted to allow access by a client computer to a service provided by a network device, and
the client computer is adapted to identify a network device to be accessed by providing to the host computer the logical identifier corresponding to the network device,
provide the logical identifier to the network device, and
cause the logical identifier to be displayed on the display device associated with the network device.

6. The apparatus of claim 5, wherein the logical identifier is a logical unit number.

7. The apparatus of claim 5, wherein the host computer comprises a logical volume information server coupled to a volume manager.

8. The apparatus of claim 7, wherein the network appliance comprises a logical volume information client.

9. The apparatus of claim 5, further comprising:
a host computer having a volume manager, the volume manager configured to
assign the logical identifier to the first device.

10. The apparatus of claim 5, further comprising:
a host computer configured to
determine a set of logical information for the network appliance, wherein
the logical information comprises logical identifiers corresponding to a plurality of physical addresses of a plurality of network devices that are controlled by the network appliance, and
send the logical information to the network appliance.

11. A system for use in a network, the system comprising:
a logical volume information client for
receiving a logical identifier at a network appliance, wherein
the logical identifier is received from a host computer coupled to the network appliance,
the logical identifier corresponds to a physical address of a network device controlled by the network appliance,
the network includes multiple network devices for providing service to one or more client computers in the network, and
the network is configured such that the one or more client computers access the network devices through the host computer,
providing the logical identifier to the network device, and
causing the logical identifier to be displayed on a display device associated with and in physical proximity to the network device.

12. The system of claim 11, wherein the logical identifier is a logical unit number.

13. The system of claim 11 further comprising:
a volume manager, coupled to a logical volume information server, for
assigning the logical identifier to the network device, and
supplying the logical identifier to a logical volume information server.

\* \* \* \* \*